US007239720B2

(12) United States Patent
Shima

(10) Patent No.: US 7,239,720 B2

(45) Date of Patent: Jul. 3, 2007

(54) OPTICAL MONITORING APPARATUS WITH IMAGE-BASED DISTANCE ACCOMMODATION

(75) Inventor: Toru Shima, Tokyo (JP)

(73) Assignee: Nikon Corporation, Tokyo (JP)

( * ) Notice: Subject to any disclaimer, the term of this patent is extended or adjusted under 35 U.S.C. 154(b) by 627 days.

(21) Appl. No.: 09/866,011

(22) Filed: May 25, 2001

(65) Prior Publication Data

US 2001/0046310 A1 Nov. 29, 2001

(30) Foreign Application Priority Data

May 29, 2000 (JP) ............................ 2000-158683

(51) Int. Cl.
*G06K 9/00* (2006.01)

(52) U.S. Cl. ....................... 382/107; 348/154; 356/27; 73/488

(58) Field of Classification Search ................ 382/103, 382/104, 106, 107; 348/154, 155; 356/27; 73/488

See application file for complete search history.

(56) References Cited

U.S. PATENT DOCUMENTS 5,559,496 A * 9/1996 Dubats .................. 340/539.26
5,821,896 A * 10/1998 Nakano et al. ............... 342/90
6,445,409 B1 * 9/2002 Ito et al. ..................... 348/155

OTHER PUBLICATIONS

Foresti, G.L. ("A real-time system for video surveillance of unattended outdoor environments"; Circuits and Systems for Video Technology, IEEE Transactions on vol. 8, Issue 6, Oct. 1998 pp.: 697-704).*

Jang et al. ("Extracting velocity information of multiple moving objects"; Surk-Woo Jang; Gye-Young Kim; Hyung-II Choi; Intelligent Vehicles Symposium, 1996., Proceedings of the 1996 IEEE Sep. 19-20, 1996 pp.: 136-140).*

* cited by examiner

*Primary Examiner*—Samir Ahmed
*Assistant Examiner*—Anand Bhatnagar
(74) *Attorney, Agent, or Firm*—Ipsolon LLP

(57) ABSTRACT

An optical monitoring system is capable of automatically identifying whether a moving body is a monitored subject based upon information in an optical (i.e., video) image. A moving body detection sub-system images a monitored region and detects a moving body from changes over time in the image of the monitored region. A speed detection sub-system detects the speed of a moving body in the image plane (i.e., speed of the moving body image in the image plane). A scale detection sub-system detects the size of a moving body in the image plane (i.e., size of the moving body in the image plane). A moving body estimation sub-system decides whether a moving body is the monitored subject (e.g., a human being) based on the image plane speed detected by the speed detection sub-system and the image plane size detected by the scale detection sub-system.

22 Claims, 11 Drawing Sheets

OPTICAL MONITORING APPARATUS WITH IMAGE-BASED DISTANCE ACCOMMODATION

This application claims priority from Japanese application No. 2000-158683, filed May 29, 2000.

TECHNICAL FIELD

The present invention pertains to an optical monitoring system that automatically monitors moving bodies (e.g., intruders, etc.).

BACKGROUND AND SUMMARY

Conventional and known optical monitoring systems for buildings, stores, etc. have video cameras (e.g., security cameras) that form and transmit images to a security center, which is sometimes located at a remote location. In this type of monitoring system, human observers in the security center constantly view and monitor the transmitted monitor images to detect any monitored subject. In a security application, for example, the monitored subject could be a human intruder. A problem with such systems is that they require a large staff of human observers.

Also known are automated optical monitoring systems that use infrared sensors, etc. to detect infrared energy generated by or emitted from the monitored subjects (e.g., intruders). These automated monitoring devices minimize the personnel burden, but they can also detect small animals, such as rats, thereby having the problem of easily generating false alarms.

Furthermore, optical monitoring systems have been considered for automatically identifying intruders with image recognition to detect a monitored subject in a monitored region. However, the size of an intruder on the image plane varies greatly according to the imaging distance. Hence, these systems suffer from the problem that intruders cannot be uniformly image-recognized.

Therefore, an object of the present invention is to provide an optical monitoring system capable of automatically identifying whether a moving body is the monitored subject based upon information in the imaged image.

In one embodiment, the invention includes a moving body detection sub-system that images a monitored region and detects a moving body from changes over time in the image of the monitored region. A speed detection sub-system detects the speed of a moving body in the image plane (i.e., speed of the moving body image in the image plane). A scale detection sub-system detects the size of a moving body in the image plane (i.e., size of the moving body in the image plane). A moving body estimation sub-system decides whether a moving body is the monitored subject (e.g., a human being) based on the image plane speed detected by the speed detection sub-system and the image plane size detected by the scale detection sub-system.

The “image plane speed” and “image plane size” referred to above are relative parameters that change together depending on the imaging distance to the moving body. That is, when the imaging distance is large, the image plane size of the moving body is small. When this happens the moving body’s image plane speed is also a small percentage, like the reduction percentage of the image plane size.

Therefore it is possible to easily cancel the effect of imaging distance included in both parameters by performing processing to find the ratio between image plane speed and image plane size, for example. By reducing the effect of, or accommodating, imaging distance based upon image information in this way, the moving body estimation sub-system of the present invention can identify a moving body without being affected by the variations in image plane size due to imaging distance.

In another embodiment, the moving body estimation sub-system has an actual scale estimation sub-system that estimates the actual size of a moving body based on the image plane speed detected by the speed detection sub-system and the image plane size detected by the scale detection sub-system. The moving body estimation sub-system decides whether a moving body is the monitored subject based on the estimated moving body’s actual size.

In this embodiment, the actual scale estimation sub-system uses an image plane ruler (i.e., length standard) for movement speed of the moving body and converts the image plane size of the moving body into an actual size that does not depend on the imaging distance. The moving body estimation sub-system decides whether a moving body is the monitored subject based on this actual size, and is essentially unaffected by imaging distance.

In another embodiment, the moving body estimation sub-system has a correlation relationship storage sub-system that stores the correlation relationships between the image plane speed and image plane size of assumed moving bodies. In addition, the correlation relationship storage sub-system has a class estimation sub-system that checks the image plane speed detected by the speed detection sub-system and the image plane size detected by the scale detection sub-system against the correlation relationships stored in the correlation relationship storage sub-system. The correlation relationship storage sub-system then estimates the class of the moving body and decides whether the moving body is the monitored subject based on the estimated class of the moving body.

For example, if the “image plane speed” to “image plane size” correlation relationship of a nimble animal such as a cockroach or bee were applied as-is to the height of a human being, that movement speed would be a speed that far surpassed the world record in the sprint (about 2 seconds for a 100-meter run). This illustrates that the “image plane speed” to “image plane size” correlation relationship varies according to the class of animal.

In this embodiment, the correlation relationship storage sub-system stores “image plane speed” to “image plane size” correlation relationships for assumed moving body classes. The class estimation sub-system estimates whether a moving body belongs to an assumed animal class by checking the image plane speed and image plane size found from the moving body image against this correlation relationship. With this sort of estimation operation it possible to identify a moving body with almost no effect from differences in image plane size due to imaging distance.

In another embodiment, the moving body estimation sub-system has a moving body evaluation sub-system that calculates an evaluation value indicating the certainty that the moving body is the monitored subject. The evaluation value is based on the image plane speed detected by the speed detection sub-system and the image plane size detected by the scale detection sub-system. The moving body estimation sub-system decides whether the moving body is the monitored subject based on the evaluation value of the moving body evaluation sub-system.

The “image plane speed” to “image plane size” correlation relationship varies according to the class of animal. Therefore it is possible to calculate an evaluation value indicating the certainty of being the monitored subject by evaluating the extent to which these two parameters match the correlation relationship of the monitored subject. Therefore, in this embodiment, a moving body is identified as the monitored subject or not based on the calculated evaluation value. This embodiment makes it possible to identify a moving body with almost no effect from differences in image plane size due to imaging distance.

In another embodiment, a moving body detection sub-system images a monitored region and detects a moving body from changes over time in the monitored region. A position detection sub-system detects the position of the moving body in the image plane. A scale detection sub-system detects the size of the moving body in the image plane. A moving body estimation sub-system decides whether the moving body is the monitored subject based on the image plane position (i.e., position of the moving body image in the image plane) detected by the position detection sub-system and the image plane size (i.e., size of the moving body image in the image plane) detected by the scale detection sub-system.

In general, the image plane position found in this manner exhibits specific tendencies according to the class of animal. For example, if it is a human being there is a high possibility it will be positioned on a path in the screen. If it is a cockroach, it is not limited to a path; it may also be positioned on a wall surface. Therefore if the image plane position is on a wall surface, the moving body can be estimated to be a cockroach or the like, not a human being. Also, even if a moving body is positioned on a path, a human being and a cockroach clearly differ with regard to image plane size. Therefore it is possible to focus in to some extent on the class of animal and make an appropriate moving body identification based on two pieces of information—image plane position and image plane size.

As an alternative in the immediately preceding embodiment, the moving body estimation sub-system may have an actual scale estimation sub-system that estimates the actual size of the moving body based on the image plane position detected by the position detection sub-system and the image plane size detected by the scale detection sub-system. In this alternative, the moving body estimation sub-system decides whether the moving body is the monitored subject based on the estimated actual size of the moving body.

In another alternative in the immediately preceding embodiment, the moving body estimation sub-system has a correlation relationship storage sub-system that stores the correlation relationships between the image plane position and image plane size of assumed moving bodies. A class estimation sub-system checks the image plane position detected by the position detection sub-system and the image plane size detected by the scale detection sub-system against the correlation relationships stored in the correlation relationship storage sub-system. The class estimation sub-system estimates the class of the moving body and decides whether the moving body is the monitored subject based on the estimated class of the moving body.

When a monitored region is determined and an imaged region is observed for a long period of time, unique tendencies appear with regard to the image plane positions that are passed through and the image plane size, and these tendencies can vary according to the class of moving body. Therefore this sort of tendency is found as a correlation relationship through statistical processing, etc., and stored in advance in the correlation relationship storage sub-system.

The class estimation sub-system checks the image plane position and image plane size of the current moving body against the correlation relationships stored in the correlation relationship storage sub-system. The class estimation sub-system estimates the class of the moving body based on the extent of the comparison. Through this sort of operation the present invention makes it possible to identify a moving body with almost no effect from differences in image plane size due to imaging distance.

In another alternative in the immediately preceding embodiment, the moving body estimation sub-system has a moving body evaluation sub-system that calculates an evaluation value indicating the certainty that the moving body is the monitored subject based on the image plane position detected by the position detection sub-system and the image plane size detected by the scale detection sub-system. The moving body estimation sub-system decides whether the moving body is the monitored subject based on the evaluation value of the moving body evaluation sub-system.

The "image plane position" to "image plane size" correlation relationship exhibits specific tendencies according to the class of moving body. Therefore it is possible to calculate an evaluation value indicating the certainty of being the monitored subject by evaluating the extent to which the detected image plane position and image plane size match the correlation relationship of the monitored subject. In this alternative, a moving body is identified as the monitored subject based on the evaluation value calculated in this way. This makes it possible to identify a moving body with almost no effect from differences in image plane size due to imaging distance.

As an alternative in any of the preceding embodiments, the moving body estimation sub-system decides whether a moving body is the monitored subject for a limited specified area of the monitored region.

In this alternative, a moving body is identified for limited specified sites in the monitored region. By limiting specified sites in this manner it is possible to appropriately increase the decision accuracy. In addition, the range subject to moving body identification is limited, so it is possible to reduce the amount of calculation processing needed for identifying a moving body.

As a result, a monitoring system according to the present invention can automatically identify intruders or other moving things with high reliability. Also, a monitoring system according to can perform automatic identification using only image plane information, so separate distance-finding devices are not necessary, and the monitoring system structure can be simple and inexpensive.

Additional objects and advantages of the present invention will be apparent from the detailed description of the preferred embodiment thereof, which proceeds with reference to the accompanying drawings.

DETAILED DESCRIPTION OF PREFERRED EMBODIMENT

First Embodiment

Figure 1:
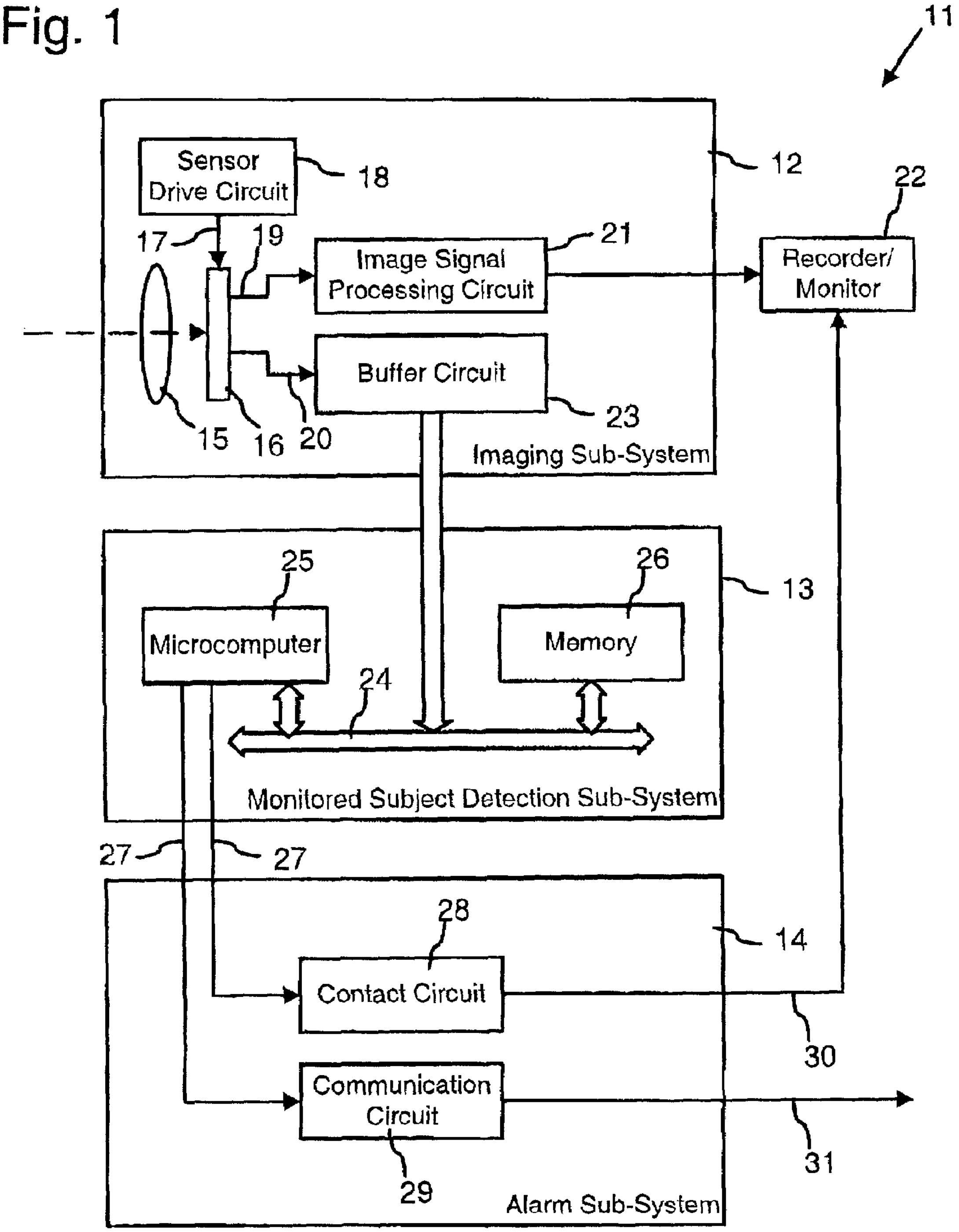
FIG. 1 is a block diagram of an optical monitoring system according to the present invention.

FIG. 1 is a block diagram of an optical monitoring device 11 according to the present invention. Optical monitoring device 11 generally includes an imaging sub-system 12, a monitored subject detection sub-system 13, and an alarm sub-system 14.

Imaging sub-system 12 includes an imaging lens 15 for receiving light from a monitored area and imaging the light at an image plane of a solid-state imaging device 16 for motion detection. An example of solid-state imaging device 16 is described in Japanese Laid-open Patent Application Hei 11-8805. Solid-state imaging device 16 for motion detection is driven according to a timing control signal output 17 from a sensor drive circuit 18.

The solid-state imaging device 16 for motion detection generates an image signal 19 and a moving body image signal 20 simultaneously in parallel. The image signal 19 is directed via an image signal processing circuit 21 to an image recorder or monitor device 22. The moving body image signal 20 is directed via a buffer circuit 23 (FIFO, etc.) to a bus 24 in the monitored subject detection sub-system 13.

The monitored subject detection sub-system 13 includes a microcomputer 25 and a memory circuit 26. The microcomputer 25 processes the moving body image signal 20 and detects a monitored subject in the moving body image, as described below in greater detail. The microcomputer 25 sends an alarm signal 27 to the alarm sub-system 14 in response to detection of the monitored subject.

The alarm part 14 includes a relay circuit 28 and a communication circuit 29. In response to an alarm signal 27 from the microcomputer 25, the relay circuit 28 outputs a control signal 30 to the switch image recorder 22 to recording status or light an alarm lamp (not shown). Also, in response to an alarm signal from the microcomputer 25, the communication circuit 29 sends an alarm signal 31 to a distant security center, etc. (not shown).

Overall Operation of this Embodiment

Figure 2:
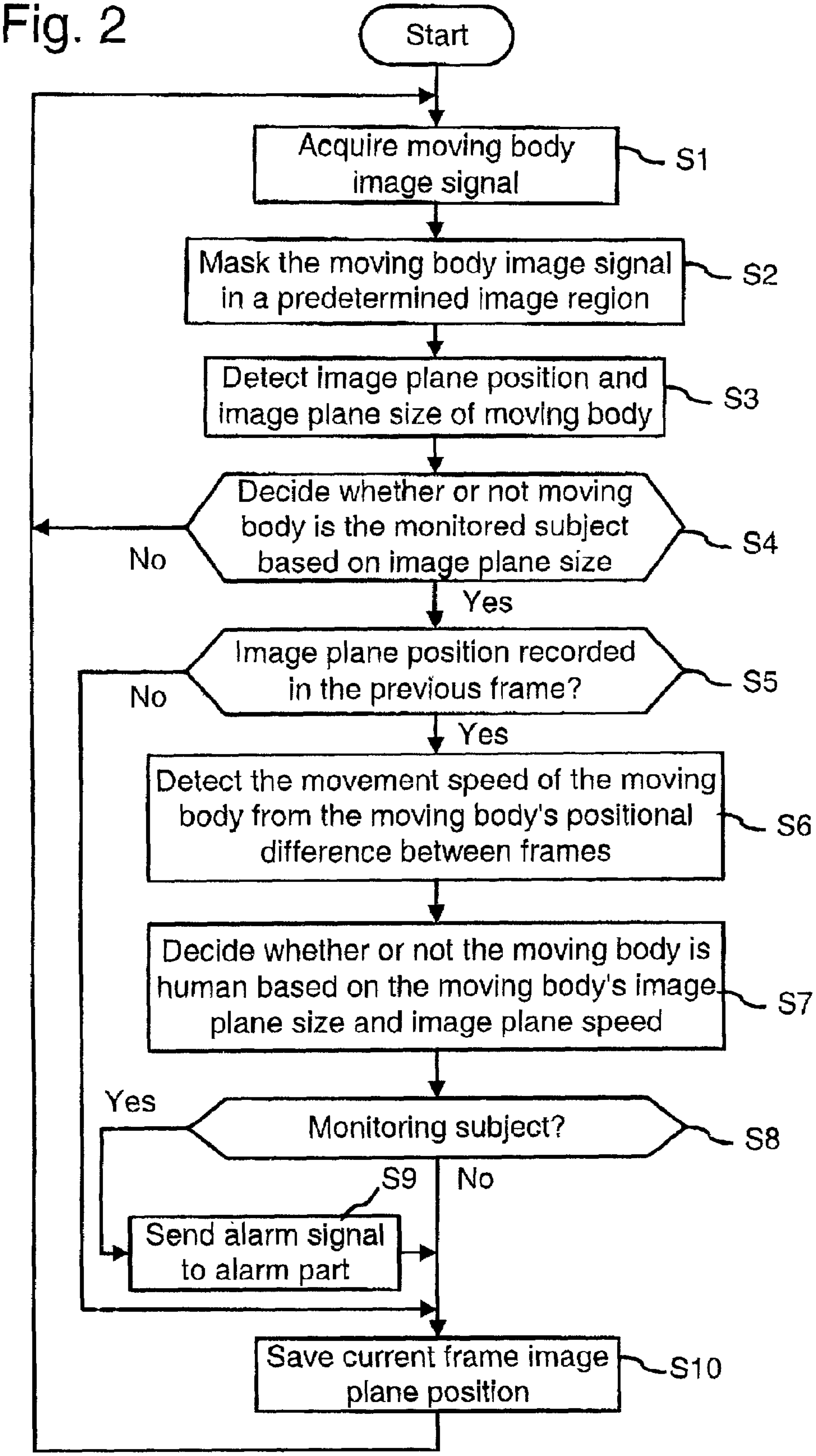
FIG. 2 is a flow diagram showing the overall operation of first–third embodiments of the monitoring system.

FIG. 2 is a flow diagram showing the overall operation of the optical monitoring device 11.

Step S1: First, the microcomputer 25 acquires the moving body image signal 20 via the memory circuit 23, and temporarily stores it in the memory circuit 26.

Step S2: In order to limit the monitored region, the microcomputer 25 masks the moving body image signal 20 in a predetermined image region.

Step S3: The microcomputer 25 detects a region indicating a moving body from the masked moving body image signal 20, and calculates the image plane position (for example, the position of the moving body centroid, the position of its vertical and horizontal edges, etc.) and image plane size of the moving body.

Step S4: The microcomputer 25 attempts a first-stage decision by deciding whether or not the moving body is the monitored subject (e.g., a human being) by deciding whether or not the image plane size is less than a threshold value.

Figure 3:
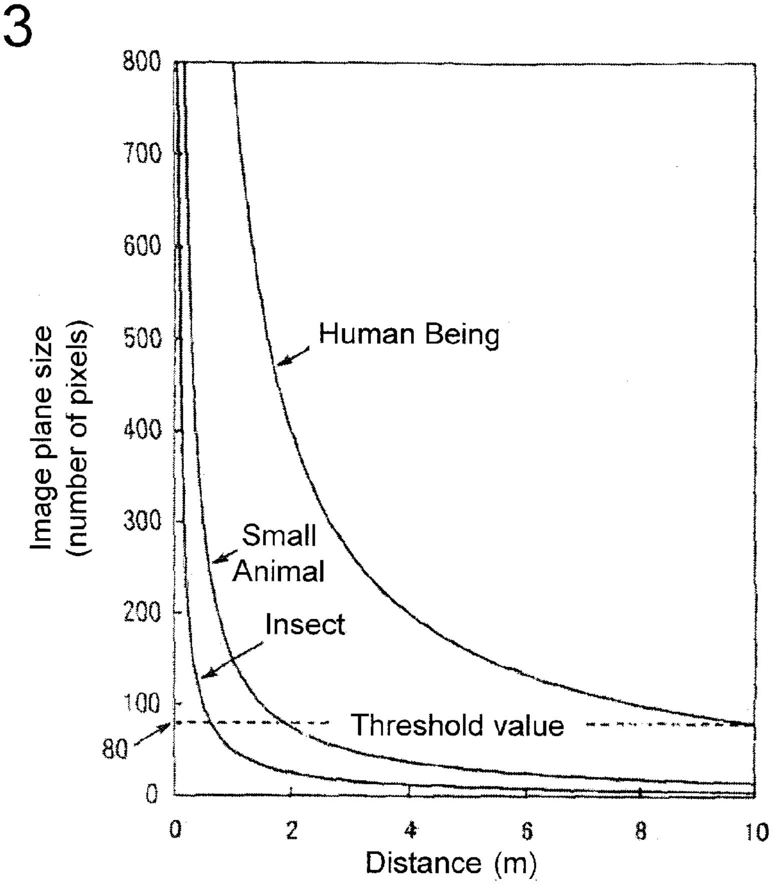
FIG. 3 is graph of imaging distance versus image plane size for explaining moving body identification using only image plane size.

FIG. 3 is a graph of imaging distance versus image plane size for explaining this first-stage decision. The horizontal axis in FIG. 3 shows imaging distance from the imaging part 12 to the moving body. The vertical axis shows the image plane size of a human being, small animal, and insect in pixel units at the image plane. This graph assumes that the height of a human being is about 1.6 m, the body length of a small animal is 0.3 m, and the body length of an insect is about 0.1 m.

In the sort of case shown in FIG. 3, by making the threshold value the minimum image plane size at which a human being appears (here it is 80 pixels) and making a first-stage decision, it is possible to reliably exclude from the moving body image as non-human "a small animal more than 2 m away" and "an insect more than 0.7 m away." Therefore when the image plane size of the moving body is less than the threshold value of 80 pixels, the microcomputer 25 quickly decides that "the moving body in the monitored region is not a human being" and returns the operation to step S1.

On the other hand, when the image plane size of the moving body equals or exceeds the threshold value of 80 pixels, the microcomputer 25 decides that "the moving body in the monitored region may be a human being" and shifts the operation to step S5 in order to make a more detailed decision.

Step S5: The microcomputer 25 decides whether or not the image plane position was recorded in the previous frame. If it was recorded, the microcomputer 25 shifts the operation to step S6. If image plane position of the previous frame was not saved, the microcomputer 25 decides that this corresponds to the first frame when the moving body appears, and shifts the operation to step S10.

Step S6: The microcomputer 25 finds the interval between the image plane position in the previous frame and the image plane position in the current frame, and calculates the image plane speed. For example, for the moving body image shown in FIG. 4, the moving body moves exactly 12 pixels between one frame and another. If the imaging rate is 10 frames/second, for example, the moving body's movement speed is equivalent to 120 pixels/second.

Step S7: Here the microcomputer 25 executes a monitored subject decision routine to be described later, and decides whether or not the moving body is the monitored subject based on the moving body's image plane size and image plane speed.

Step S8: If it decides the moving body is the monitored subject, the microcomputer 25 shifts the operation to step S9. On the other hand, if it decides the moving body is not the monitored subject, it shifts the operation to step S10.

Step S9: When the monitored subject is detected the microcomputer 25 sends an alarm signal to the alarm part 14. Subsequently the microcomputer 25 shifts the operation to step S10.

Step S10: For the next and subsequent detections of image plane speed the microcomputer 25 saves the moving body's image plane position in the current frame. Subsequently, the microcomputer 25 returns the operation to step S1.

Through the series of operations described above, the monitoring device can perform automated monitoring.

Detailed Explanation of the Monitored Subject Decision Routine

Figure 5:
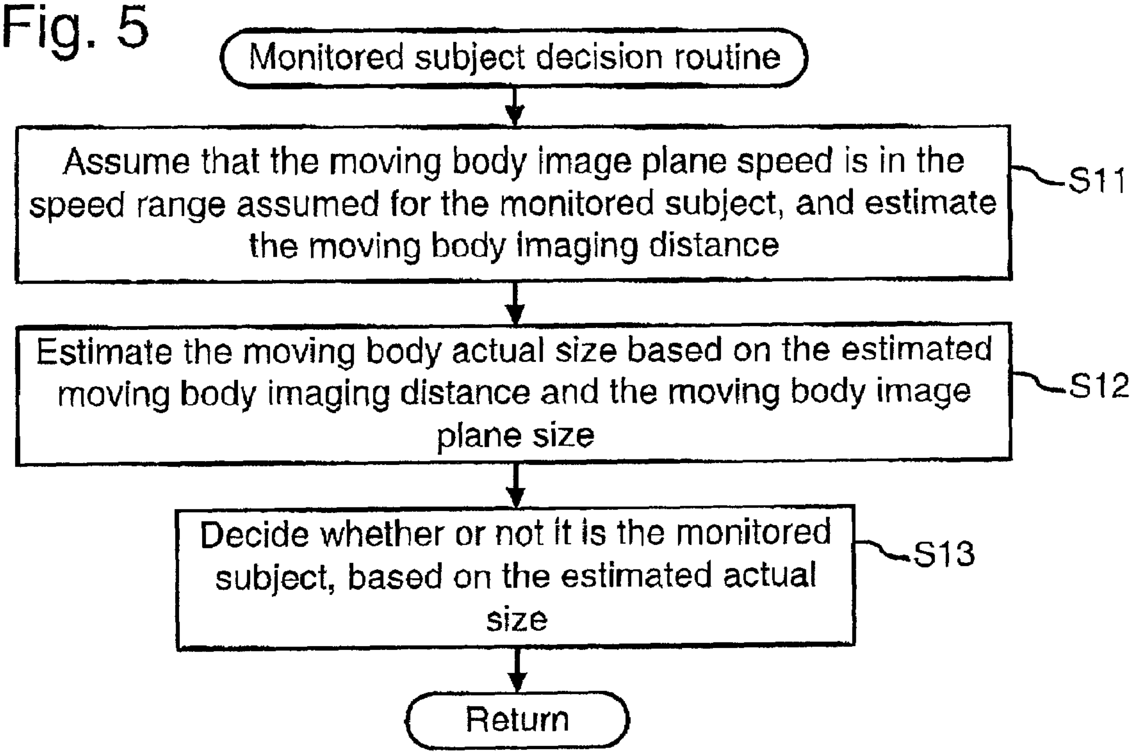
FIG. 5 is a flow diagram of a monitored subject decision routine in the first embodiment.

FIG. 5 is a flow diagram showing the monitored subject decision routine of the first embodiment. The previously noted step S7 decision routine will be explained in detail using FIG. 5.

Step S11: The microcomputer 25 assumes that the moving body's image plane speed is in the speed range assumed for the monitored subject (in this case, a human being), and estimates or accommodates the moving body's imaging distance.

Figure 4:
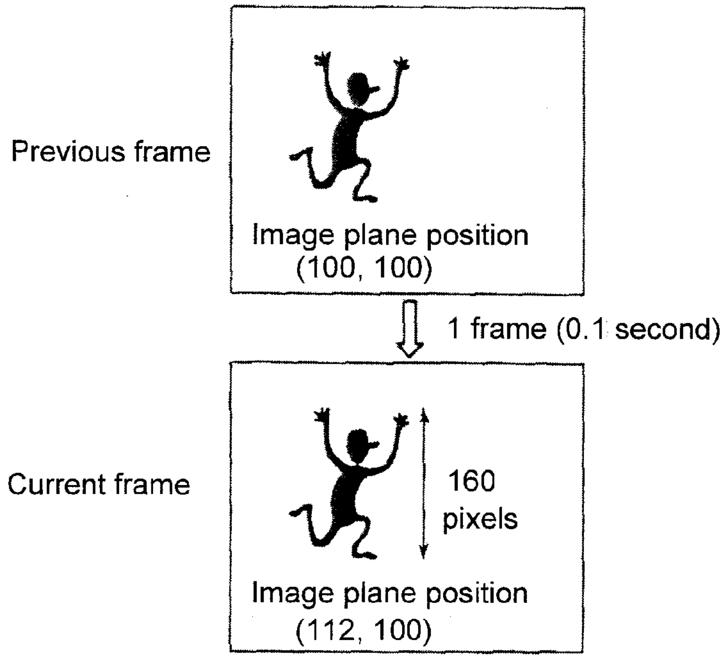
FIG. 4 is a drawing showing one example of a moving body image.

For example, in the case of the moving body image shown in FIG. 4, the moving body's image plans speed is 120 pixels/frame, based upon the image plane speed of 12 pixels/frame and an exemplary image rate of 10 frames/second. For example, the optical system of imaging part 12 may project a subject with dimensions 1 m located at an imaging of 5 m on the image plane as 100 pixels. Therefore, if we assume that the assumed human speed range of 0.8–1.6 m/second is projected at an image plane speed of 120 pixels/second, the imaging distance is 3.3–6.7 m.

Step S12: The microcomputer 25 estimates the moving body's actual size from the estimated moving body's imaging distance and the moving body's image plane size.

In the case of the moving body image shown in FIG. 4, the moving body's image plane size is 160 pixels. The estimated imaging distance is 3.3–6.7 m, so the actual size of the moving body is estimated to be 1.1–2.1 m.

Step S13: Based on the moving body's actual size, the microcomputer 25 decides whether or not the moving body is the monitored subject (here, a human being).

In the case of the moving body image shown in FIG. 4, the moving body's actual size is 1.1–2.1 m, which overlaps the size range assumed as human. Also, it clearly differs from the size assumed for a small animal or insect. Therefore the moving body shown in FIG. 4 is identified as a human being.

Incidentally, if the moving body shown in FIG. 4 is assumed to be a small animal with movement speed about 0.5–1.0 m/sec, the resulting estimated body length of the assumed small animal is 0.67–1.33 m. This is clearly different from the body length assumed from a rat or other small animal, and produces the decision "the moving body shown in FIG. 4 is not a small animal."

In addition, if the moving body shown in FIG. 4 is assumed to be an insect with movement speed of 0.3–1.0 m/sec, the resulting estimated body length of the assumed insect=0.40–1.33 m. This is clearly different from the body length assumed from a flying insect or other insect, and produces the decision "the moving body shown in FIG. 4 is not an insect," In this manner the present invention makes it possible to identify a moving body with almost no effect from differences in image plane size due to imaging distance.

Effect of the First Embodiment

Through the operations described above the first embodiment makes it possible to appropriately decide whether or not a moving body is the monitored subject regardless of the size of the moving body in the image plane. In particular, the first embodiment estimates the actual size of a moving body, so it is suitable for monitoring applications where estimating actual scale is important, such as identifying whether a moving body is a child or an adult.

Second Embodiment

Figure 6:
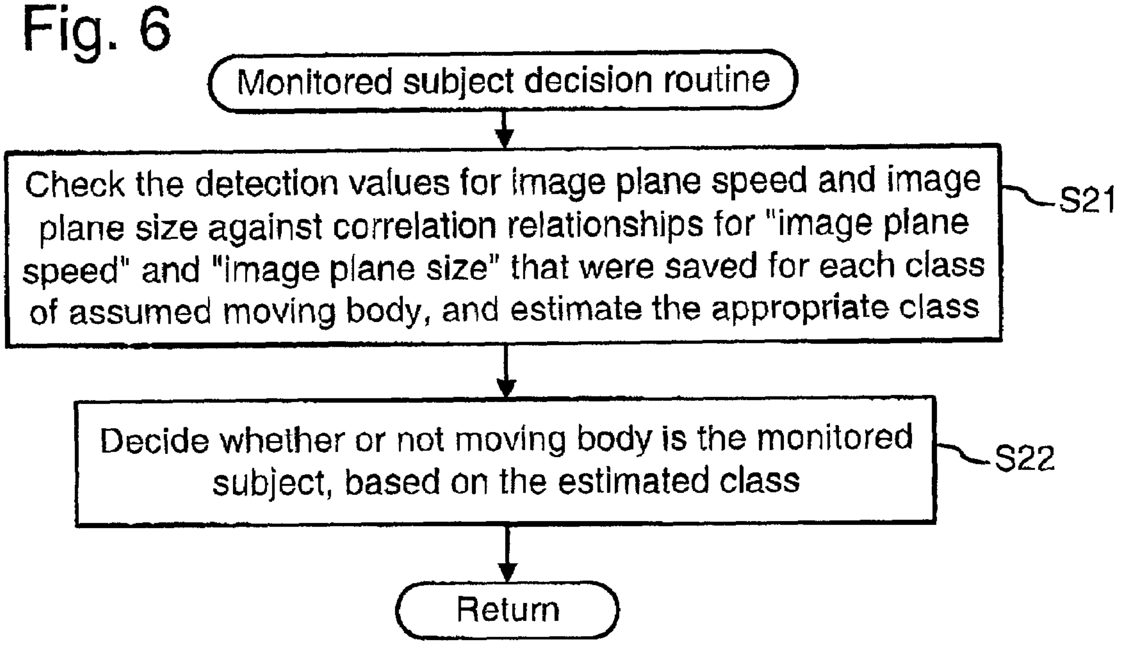
FIG. 6 is a flow diagram of a monitored subject decision routine in the second embodiment.

The constitution and overall operation of the second embodiment are the same as for the first embodiment (FIG. 1, FIG. 2). The operational feature of the second embodiment is the point about deciding whether a moving body is the monitored subject according to the decision routine shown in FIG. 6.

Step S21: A "correlation relationship between image plane speed and image plane size" statistically obtained from previous imaging test results is stored in the memory circuit 26 for each class of moving body. The microcomputer 25 estimates the moving body class by checking the moving body's image plane speed and image plane size against these correlation relationships.

Step S22: The microcomputer 25 decides if the moving body is the monitored subject based on the estimated moving body class.

Through the decision operation described above the second embodiment makes it possible to appropriately decide whether or not a moving body is the monitored subject regardless of the size of the moving body in the image plane.

Third Embodiment

Figure 7:
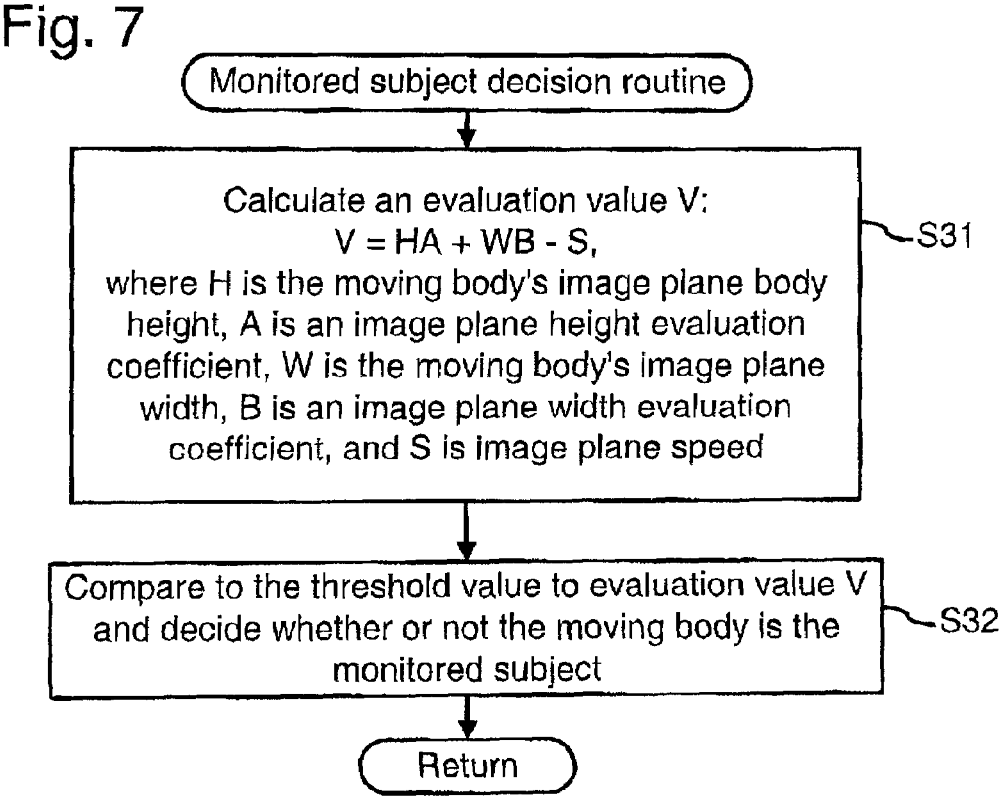
FIG. 7 is a flow diagram of a monitored subject decision routine in the third embodiment.

The constitution and overall operation of the third embodiment are the same as for the first embodiment (FIG. 1, FIG. 2). The operational feature of the third embodiment is the point about deciding whether or not a moving body is the monitored subject according to the decision routine shown in FIG. 7.

Step S31: The microcomputer 25 calculates an evaluation value V indicating the certainty that a moving body is the monitored subject (e.g., a human being) according to the following equation:

$$V=HA+WB-S,$$

where H is the moving body's image plane body height, A is an image plane height evaluation coefficient, W is the moving body's image plane width, B is an image plane width evaluation coefficient, and S is image plane speed.

Since a human being is a tall moving body, the image plane height evaluation coefficient A is set large in order to make the evaluation value high when the moving body is a human being. Also, for human beings it should be noted that the image plane speed is relatively slow compared to the image plane size, so a negative evaluation coefficient is applied to the image plane speed. As a result, the evaluation value V calculated from the equation above gives a high value for a human being and gives a low value for an insect or small animal.

Step S32: The microcomputer 25 compares the threshold value to the evaluation value, V, and decides whether or not the moving body is the monitored subject (e.g., a human being).

Through the decision operation described above the third embodiment makes it possible to appropriately decide whether or not a moving body is the monitored subject regardless of the size of the moving body in the image plane.

Fourth Embodiment

Figure 8:
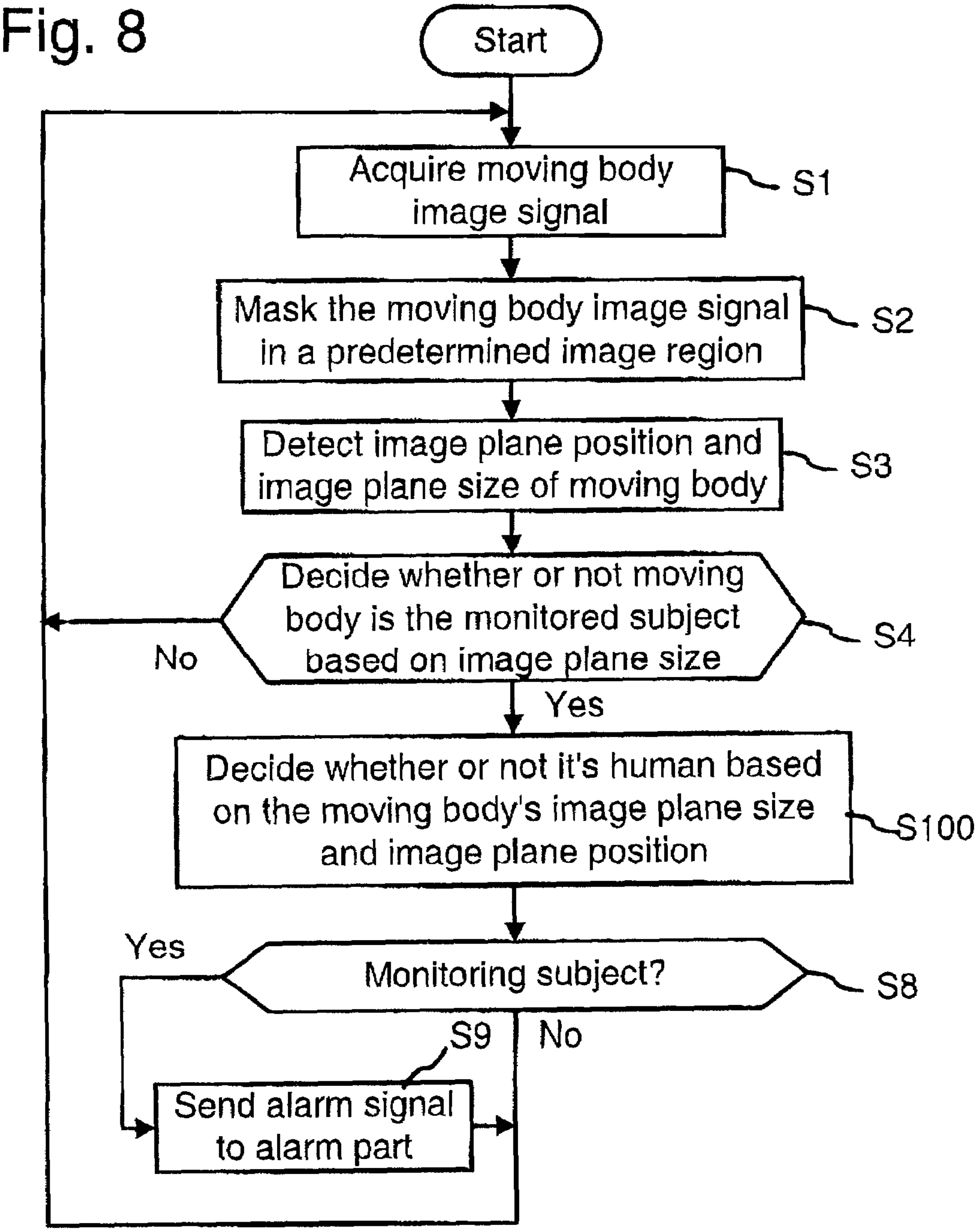
FIG. 8 is a flow diagram showing fourth-sixth embodiments of the overall operation of the monitoring system.
Figure 9:
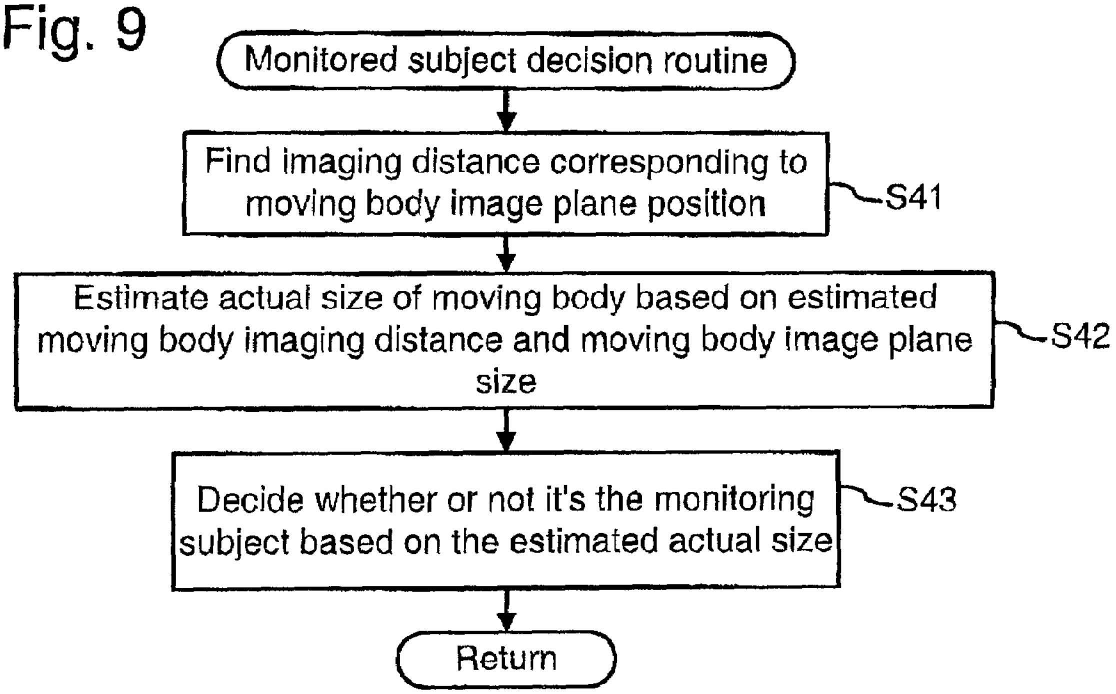
FIG. 9 is a flow diagram showing the monitored subject decision routine in the fourth embodiment.

FIG. 8 is a flow diagram showing the overall operation of the fourth embodiment. As shown in FIG. 8, the overall operation of the fourth embodiment omits the operations related to image plane speed in the first embodiment (FIG. 2) (S5, S6, S10). Otherwise, the constitution of the fourth embodiment is the same as for the first embodiment (FIG. 1). The operational feature of the fourth embodiment is the decision routine (S100) shown in FIG. 8. FIG. 9 is a flow diagram showing the specific operation of this decision routine.

Step S41: The association relationship between image plane position and imaging distance is stored in advance in the memory circuit 26. The microcomputer 25 estimates the moving body's imaging distance by fitting the moving body's image plane position to this association relationship.

Step S42: The microcomputer 25 estimates the moving body's actual size from the estimated moving body's imaging distance and the moving body's image plane size.

Step S43: The microcomputer 26 decides whether the moving body is the monitored subject (e.g., a human being) based on the estimated moving body's actual size.

Through the operation described above the fourth embodiment makes it possible to appropriately decide whether or not a moving body is the monitored subject regardless of the size of the moving body in the image plane.

Fifth Embodiment

Figure 10:
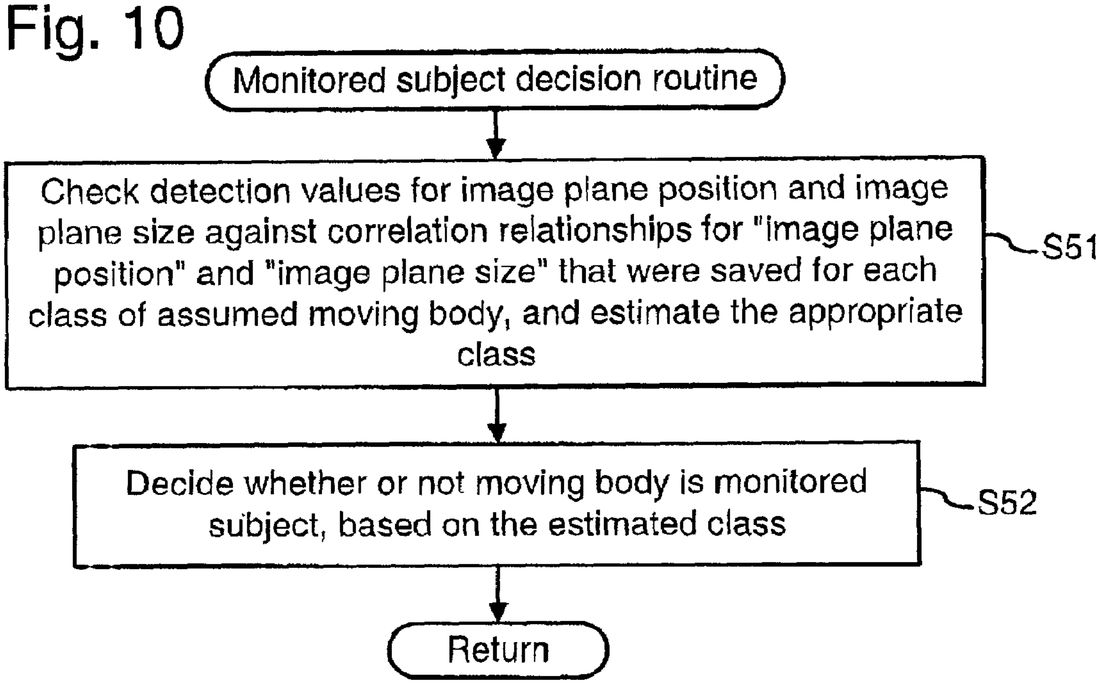
FIG. 10 is a flow diagram showing the monitored subject decision routine in the fifth embodiment.

The constitution of the fifth embodiment is the same as for the first embodiment (FIG. 1), and the overall operation of the fifth embodiment is the same as for the fourth embodiment (FIG. 8). The operational feature of the fifth embodiment is the point about deciding whether or not a moving body is the monitored subject according to the decision routine shown in FIG. 10.

Step S51: A “correlation relationship between image plane position and image plane size” statistically obtained from previous imaging test results is stored in the memory circuit 26 for each class of moving body. The microcomputer 25 estimates the moving body class by checking the moving body's image plane position and image plane size against these correlation relationships.

Step S52: The microcomputer 25 decides if the moving body is the monitored subject based on the estimated moving body class.

Through the decision operation described above the fifth embodiment makes it possible to appropriately decide whether or not a moving body is the monitored subject regardless of the size of the moving body in the image plane.

Sixth Embodiment

Figure 11:
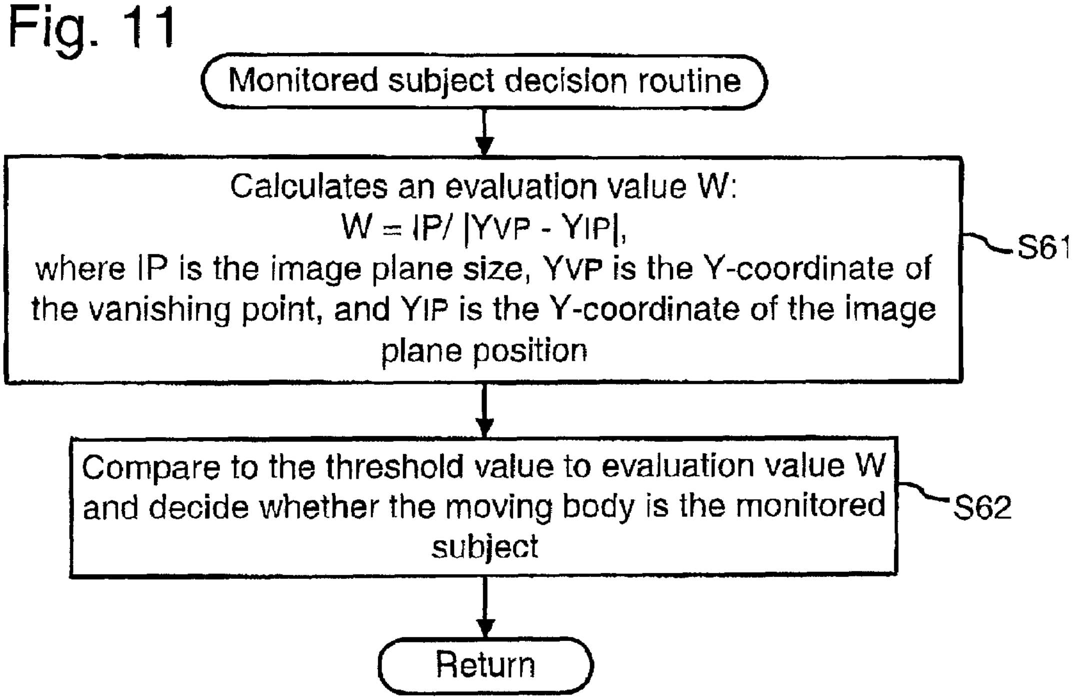
FIG. 11 is a flow diagram showing the monitored subject decision routine in the sixth embodiment.

The constitution of the sixth embodiment is the same as for the first embodiment (FIG. 1), and the overall operation of the sixth embodiment is the same as for the fourth embodiment (FIG. 8). The operational feature of the sixth embodiment is the point about deciding whether or not a moving body is the monitored subject according to the decision routine shown in FIG. 11.

Step S61: The microcomputer 25 calculates an evaluation value W indicating the certainty that a moving body is a human being according to the following equation:

$$W=I_P/|Y_{VP}-Y_{IP}|,$$

where $I_P$ is the image plane size, $Y_{VP}$ is the Y-coordinate of the vanishing point, and $Y_{IP}$ is the Y-coordinate of the image plane position.

Figure 12:
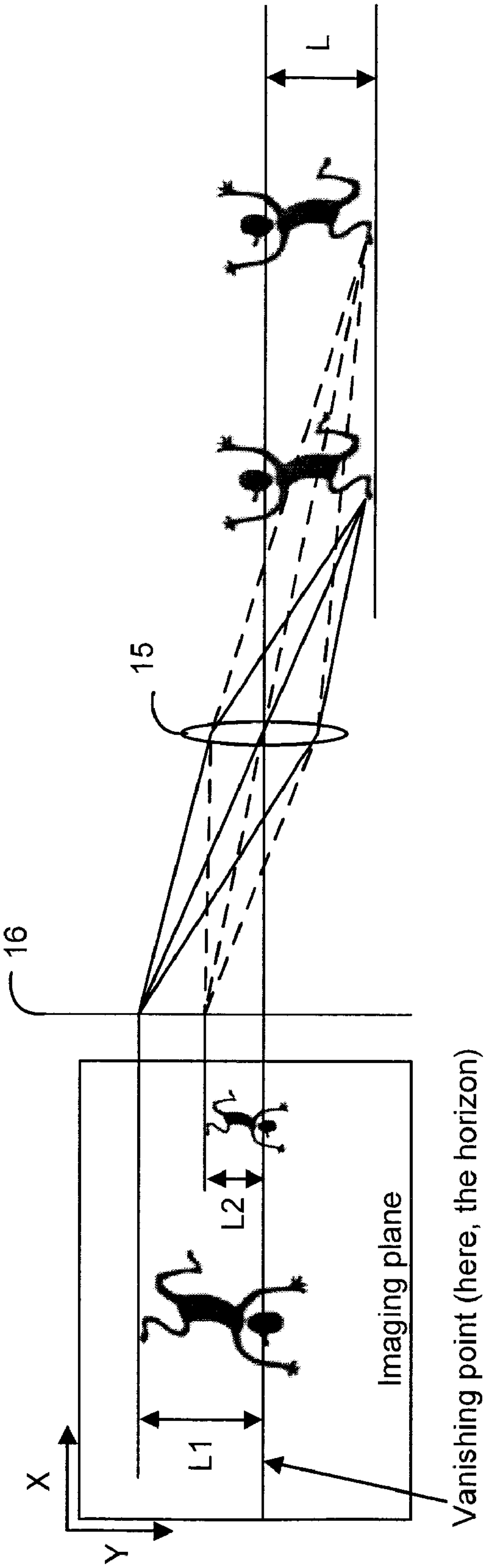
FIG. 12 is an optical schematic diagram illustrating the basic principle of the evaluation calculation in the sixth embodiment.

The denominator term in this equation corresponds to lengths L1 and L2 in the image plane shown in FIG. 12, for example. These lengths L1 and L2 are lengths that are the same length L in the field of view but have undergone their respective perspective conversions, thereby providing an estimate or substitute parameter for the imaging distance. Therefore it is possible to use lengths L1 and L2 for each moving body's ruler (i.e., length standard) and compare the moving body sizes in the image plane. In the equation above, the image plane size is divided by this sort of denominator term. As a result, the evaluation value W is calculated in proportion to the actual size of the moving body.

Furthermore, FIG. 12 shows a case in which the position of the bottom edge of the moving body image is used as the image plane position, but the present invention is not limited to this implementation. In general, any image plane position that does not overlap the vanishing point can be evaluated by the aforesaid equation. For example, it is possible to use a moving body's centroid, top edge, left edge, right edge, etc. as the image plane position.

Step S62. The microcomputer 25 compares the threshold value to the evaluation value W, and decides whether or not the moving body is the monitored subject (e.g., a human being). When doing so, if the evaluation value W is less than the threshold value, the moving body is too small to be a human being, so it is identified as an insect or small animal. And if it is equal to or greater than the threshold value, the size is that assumed for a human being, so it is identified as a human being. Furthermore, this threshold value should be varied in a way that is linked to any angle of view setting (zoom adjustment) of the imaging lens 15.

Through the decision operation described above the sixth embodiment makes it possible to appropriately decide whether or not a moving body is the monitored subject regardless of the size of the moving body in the image plane.

Supplementary Embodiment Matters

The embodiments described above explained cases in which the decision operation regarding the monitored subject was performed independently, but the present invention is not limited to such implementations. For example, it is possible to perform a more highly reliable decision operation by combining a number of decision operations or by combining separate decision operations.

Also, in the aforesaid embodiments the image plane size was treated as one-dimensional data in the decision operation regarding the monitored subject, but the present invention is not limited to this implementation. For example, the image plane size may also be treated as two-dimensional data (vertical width, horizontal width). In this case it is possible to add moving body shape information to the decision operation, and a more highly precise decision operation is possible. For example, the area of the moving body can be found by counting the moving body's number of pixels, etc., and this area can be treated as the image plane size.

Also, in the embodiments described above an alarm signal was output to the alarm part 14 simultaneously with identification of the monitored subject. This has the excellent advantage that the monitored subject is reported quickly and the recording operation or alarm operation can begin swiftly. Nevertheless, the present invention is not limited to this implementation. For example, the alarm signal can be output if identification of the monitored subject continues for exactly a specified number of times, or if it is identified frequently. This has the advantage of preventing erroneous identification caused by noise, etc.

Furthermore, the embodiments described above explained cases in which a human being was the monitored subject, but the present invention is not limited to this implementation. For example, an insect or small animal or other creature may be the monitored subject. The monitored subject may also be smoke or fire or other phenomena.

Also, the embodiments described above generated a moving body image signal using the solid-state imaging device 16 for motion detection. This has the excellent advantage that absolutely no external circuits are needed to generate the moving body image signal, and the overall structure of the monitoring device can be simple and inexpensive. Nevertheless, the present invention is not limited to this implementation. Of course it is also possible features such as an imaging element and image memory and image processing circuit, etc., and generate the moving body image signal.

Also, in the aforesaid first through third embodiments the image plane speed was found from the moving body movement interval between frames. Nevertheless, the present invention is not limited to this implementation. Of course the image plane speed can also be found from the moving body image's edge width or edge area, etc.

Furthermore, in the aforesaid first through third embodiments the momentary image plane speed was found. This has the advantage that moving body identification using image plane speed can be done in real time or at high frequency. Nevertheless, the present invention is not limited to this implementation. For example, it is also possible to find the average value, maximum value, or minimum value of the image plane speed and make the aforesaid decision using this value. This has the advantage that a moving body that is changing speed can be identified by a constant standard.

Effect of the Invention

The present invention decides whether a moving body is a predetermined monitored subject (e.g., a human being) based on image plane speed and image plane size. This reduces the effect of imaging distance based on image plane speed and image plane size, so it is possible to appropriately decide whether the moving body is the monitored subject with almost no affect from the size of the moving body in the image plane.

In one embodiment, the invention uses an image plane ruler (i.e., length standard) for the moving body's movement speed and converts the moving body's image plane size into an estimated actual size that does not depend on the imaging distance. Therefore it is suitable for monitoring applications that need to estimate actual scale, such as identifying whether a moving body is a child or an adult.

Also, the invention can estimate the moving body class by checking an "image plane speed" to "image plane size" correlation relationship. In this case it is possible to accurately find the correlation relationship using statistical methods, etc. Therefore it is possible to decide whether or not a moving body is the monitored subject with statistically reliable precision.

In addition, the invention can perform an evaluation calculation based on image plane speed and image plane size. In this case it is possible to decide whether or not a moving body is the monitored subject with a relatively small amount of calculation processing.

On the other hand, the invention can decide whether a moving body is the monitored subject based on image plane position and image plane size. In this case it is possible to more accurately decide whether a moving body is the monitored subject by adding information on its image plane position. In particular, the invention can convert the moving body's image plane size into an actual size that does not depend on imaging distance, based on the image plane position. Therefore it is suitable for monitoring applications that need to estimate actual scale, such as identifying whether a moving body is a child or an adult.

Also, the invention can estimate the moving body class by checking an "image plane position" to "image plane size" correlation relationship. In this case it is possible to accurately find the correlation relationship using statistical methods, etc. Therefore it is possible to decide whether or not a moving body is the monitored subject with statistically reliable precision.

Also, the invention can perform an evaluation calculation based on image plane position and image plane size. In this case it is possible to decide whether or not a moving body is the monitored subject with a relatively small amount of calculation processing.

Furthermore, the invention can decide whether a moving body is the monitored subject for a limited specified area of the monitored region. In this case it is possible to appropriately avoid a reduction in decision precision by the aforesaid invention due to special characteristics of the monitored region, and it is possible to increase the reliability of moving body identification in the aforesaid invention. Also, it is possible to reduce the amount of calculation in moving body identification.

Due to the various effects of the present invention as described above, a monitoring device employing the present invention can automatically identify intruders or other moving things with high reliability. Also, it performs automatic identification using only image plane information, so separately included distance-finding devices are not necessary, and the monitoring device structure can be made simple and inexpensive.

Figure 13:
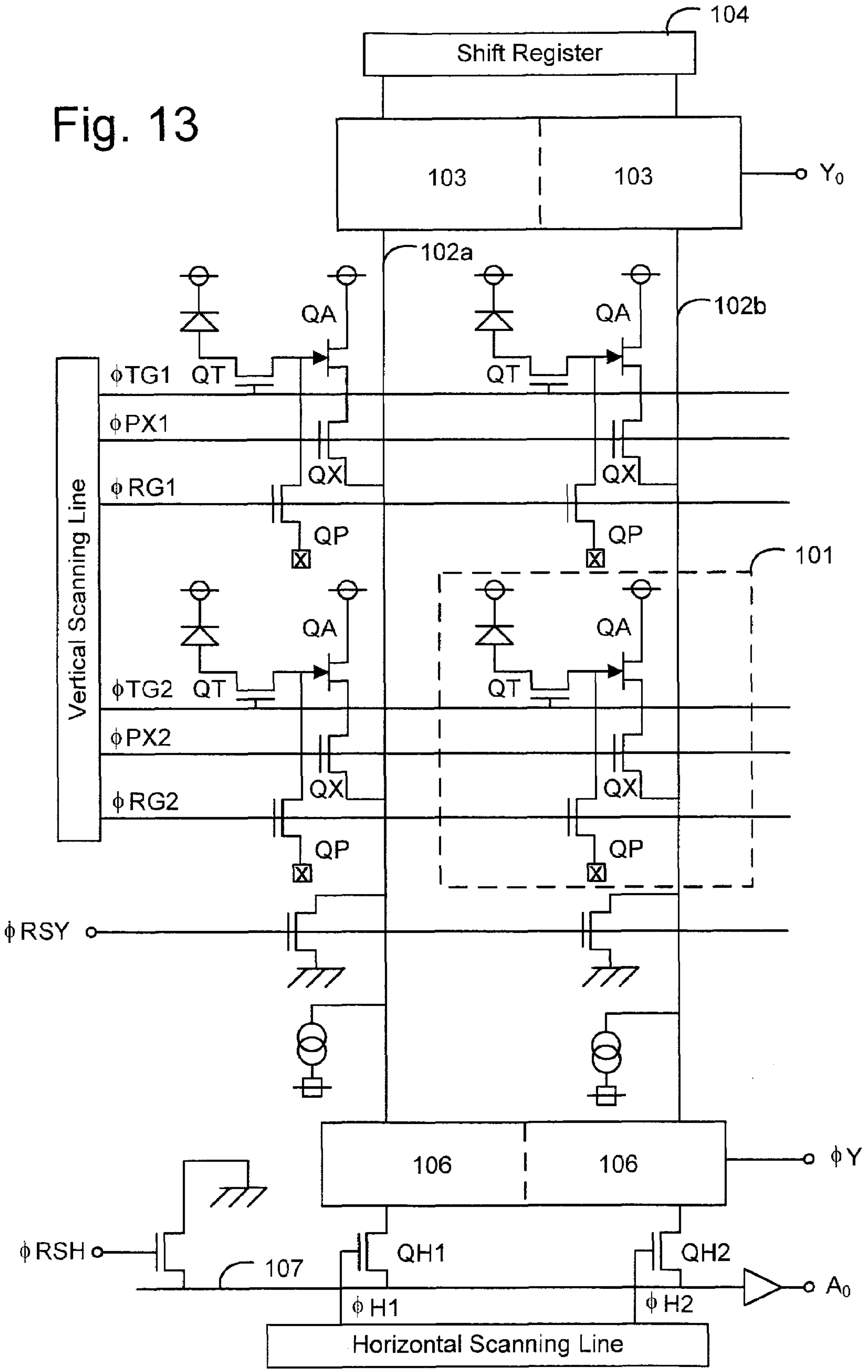
FIG. 13 is a schematic circuit diagram of a motion detection sensor.

FIG. 13 is a schematic circuit diagram that shows the schematic structure of motion detection sensor 16 used in this optical monitoring apparatus. Moreover, motion detection sensor 16 shown in FIG. 13 is a solid-state camera element, and has several pixels 101 arranged in a matrix (in the figure, for simplicity, four pixels are shown arranged in a 2×2 matrix).

Vertical reading lines 102*a* and 102*b* are installed on each column of pixels 110 arranged vertically. These are connected both to pixels 101 by way of transistor QX explained below, and to deviation detection circuit 103 and image signal generating circuit 106.

The output of deviation detection circuit 103 is connected to shift register 104, and the output of image signal generating circuit 106 is connected to horizontal reading line 107 by way of horizontal reading switching transistors QH1 and QH2.

Each of pixels 101 is comprised of photodiode PD that generates a charge corresponding to incident light, junction field effect transistor QA that outputs an electrical signal corresponding to the charge generated by photodiode PD, transmitting MOS transistor QT that transmits the charge generated by photodiode PD directly to the gate region of transistor QA, resetting transistor QP that discharges the charge accumulated in the gate region of transistor QA, and switching MOS transistor QX that connects or separates vertical reading lines 102*a* and 102*b* and transistor QA.

Figure 14:
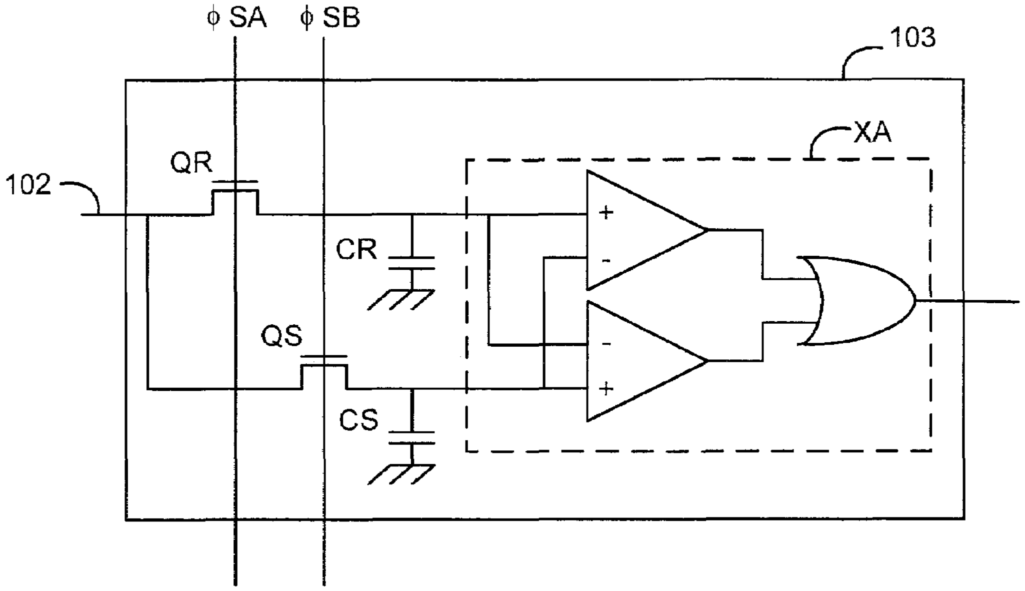
FIG. 14 is a schematic circuit diagram of a deviation detection circuit.

FIG. 14 is a schematic circuit diagram that shows the structure of deviation detection circuit 103.

In this figure, deviation detection circuit 103 is comprised of switching MOS transistors QR and QS, capacitors CR and CS that accumulate a charge corresponding to the electrical signal outputted by pixel 101 at different timings, and comparison circuit XA that compares the charges accumulated in capacitors CR and CS.

Figure 15:
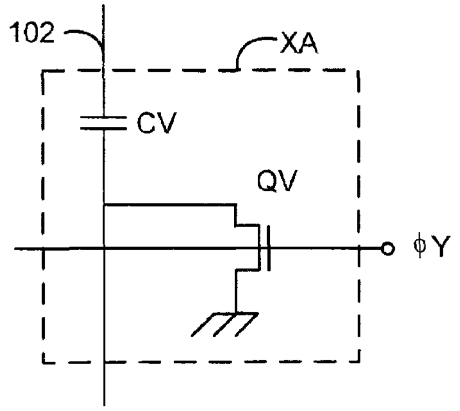
FIG. 15 is a schematic circuit diagram of an image signal generating circuit.

FIG. 15 is a schematic circuit diagram that shows the structure of image signal generating circuit 106.

In this figure, image signal generating circuit 106 is comprised of capacitor CV that accumulates a charge corresponding to the electrical signal outputted by pixel 101, and transistor QV for applying sampling hold switching to capacitor CV.

In motion detection sensor 16, the optical image obtained by lens 15 is imaged and subjected to photoelectric conversion by photodiode PD in each pixel 101 at a predetermined timing.

When the signal charge generated by photodiode PD by this type of photoelectric conversion is conducted to transistor QT in pixel 101, it is transmitted to the gate of transistor QT. Following this, when transistor QT becomes nonconducting, the gate region of transistor QA becomes floating, but holds the above-mentioned signal charge by parasitic capacitance effect. That is, the gate region of transistor QA accumulates the signal charge generated by photodiode PD and acts as a memory that temporarily holds this.

Next, the case is considered when the signal charge for the previous frame already is accumulated in the gate region of transistor QA and a new signal charge for the current frame is generated by photodiode PD.

In this state, when transistor QX in pixel 101 and transistor QR in deviation detection circuit 103 become conducting, transistor QA acts as a source follower, and a charge corresponding to the signal charge for the previous frame accumulated in the gate region of transistor QA is charged to capacitor CR in deviation detection circuit 103 by way of vertical reading line 102. In addition, when transistor QP in pixel 101 becomes conducting, the signal charge accumulated in the gate region of transistor QA is discharged to initialize the transistor.

Following this, when transistor QT in pixel 101 becomes conducting, the new signal charge for the current frame generated by photodiode PD is transmitted to the gate of transistor QA. In addition, when transistor QX in pixel 101 and transistor QS in deviation detection circuit 10, become conducting, transistor QA acts as a source follower, and a charge corresponding to the signal charge for the current frame accumulated in the gate region of transistor QA is charged to capacitor CS in deviation detection circuit 103 by way of vertical reading line 102.

That is, within deviation detection circuit 103, a charge corresponding to the signal charge for the previous frame is accumulated in capacitor CR and a charge corresponding to the signal charge for the current frame is accumulated in capacitor CS.

In addition, the signal charge for the current frame transmitted to the gate of transistor QA in pixel 101 is held in the gate region of this transistor QA, and in the next frame, is used as the signal charge corresponding to the previous frame.

Comparison circuit XA obtains the absolute value of the difference in signal voltage corresponding to the charges to capacitor CR and capacitor CS. In addition, comparison circuit XA outputs a signal indicating "1" (or "0": signal level that indicates that motion is present) when the absolute value obtained is greater than or equal to a set value, and outputs a signal indicating "0" (or "1": signal level that indicates that motion is not present) when the absolute value obtained is less than a set value. The signal outputted by comparison circuit XA in this way is outputted externally in sequence by way of shift register 104.

That is, a motion signal can be obtained easily by comparing signal voltages that correspond to signal charges corresponding to two continuous frames for each pixel.

In addition, after transistor QP in pixel 101 becomes conducting, the signal charge accumulated in the gate region of transistor QA is discharged, and the transistor is initialized, when transistor QX in pixel 101 and transistor QS in deviation detection circuit 103 become conducting, transistor QA acts as a source follower, and a charge corresponding to the initialized state of the gate region of this transistor QA is charged to capacitor CV in image signal generating circuit 106 by way of vertical reading line 102. In addition, the signal charged to capacitor CV in this way is held in capacitor CV even after transistor QV becomes nonconducting and capacitor CV becomes floating.

Following this, when transistor QT in pixel 101 becomes conducting, the signal charge for the current frame generated by photodiode PD is transmitted to the gate region of transistor QA. In this state, when transistor QX in pixel 101 becomes conducting, transistor QA again acts as a source follower, and a signal corresponding to the signal charge accumulated in the gate region of transistor QA is inputted to capacitor CV in image signal generating circuit 106 by way of vertical reading line 102.

In this case, because capacitor CV already holds a charge corresponding to the state after the gate region of transistor QA in pixel 101 was initialized, from the output of capacitor CV (the output of image signal generating circuit 106), a signal is outputted that corresponds to the difference between the signal determined by the state of accumulation of the signal charge for the current frame in the gate region of transistor QA in pixel 101 and the signal corresponding to the state after being initialized.

It is known that the signal corresponding to the state after the gate region of transistor QA in pixel 101 is initialized contains voltage discrepancies between the gate and the source of transistor QA that cause fixed pattern noise, and reset noise (so-called kTC noise) just after the gate region of transistor QA in pixel 101 is initialized that causes random noise. However, in this embodiment, image signal generating circuit 106 can obtain an image signal from which fixed pattern noise and random noise have been eliminated.

Therefore, motion detection sensor 16 can output a motion signal and an image signal simultaneously. Moreover, the motion signal and image signal outputted by motion detection sensor 16 in this way are supplied to processing circuit 21 and buffer circuit 23.

In view of the many possible embodiments to which the principles of this invention may be applied, it should be recognized that the detailed embodiments are illustrative only and should not be taken as limiting the scope of the invention. Rather, I claim as my invention all such embodiments as may come within the scope and spirit of the following claims and equivalents thereto.

The invention claimed is:

1. An optical monitoring system, comprising:

a moving body detection sub-system that images a monitored region onto an optical image plane and detects a moving body from changes over time in the monitored region;

a speed detection sub-system that detects a speed of the moving body in the optical image plane;

a scale detection sub-system that detects a size for the moving body in the optical image plane; and a moving body estimation sub-system that decides whether the moving body is a predetermined monitored subject based on the speed detected by the speed detection sub-system and the size detected by the scale detection sub-system, the moving body estimation sub-system having an actual scale estimation sub-system that determines an estimated actual size of the moving body based on the speed detected by the speed detection sub-system and the size detected by the scale detection sub-system, the moving body estimation sub-system deciding whether the moving body is the predetermined monitored subject based on the estimated actual size of the moving body.

2. The monitoring system of claim 1, wherein the moving body estimation sub-system includes:

a correlation relationship storage sub-system that stores correlation relationships between the speed and size of predetermined classes of moving bodies; and a class estimation sub-system that compares the speed detected by the speed detection sub-system and the size detected by the scale detection sub-system against the correlation relationships stored in the correlation relationship storage sub-system to estimate a class for the moving body, the class estimation sub-system deciding whether the moving body is the predetermined monitored subject based on the estimated class of the moving body.

3. The monitoring system of claim 2, wherein the correlation relationship storage sub-system stores correlation relationships between speed and size statistically obtained from previous imaging test results for each class of moving body.

4. The monitoring system of claim 1, wherein the moving body estimation sub-system includes a moving body evaluation sub-system that determines an evaluation value indicating a certainty that the moving body is the predetermined monitored subject based on the speed detected by the speed detection sub-system and the size detected by the scale detection sub-system, the moving body evaluation sub-system deciding whether the moving body is the predetermined monitored subject based on the evaluation value determined by the moving body evaluation sub-system.

5. The monitoring system of claim 1, wherein the scale detection sub-system detects a size for the moving body in only one dimension in the image plane.

6. The monitoring system of claim 1, wherein the scale detection sub-system detects a size for the moving body in two dimensions in the optical image plane.

7. The monitoring system of claim 6, wherein the scale detection sub-system applies different weighting factors to the two dimensions in the optical image plane to provide improved identification of the predetermined monitored subject.

8. The monitoring system of claim 6, wherein the two dimensions in the optical image plane correspond to horizontal and vertical directions in the monitored region, and the scale detection sub-system applies different weighting factors to the two dimensions in the optical image plane, with a greater weighting factor being applied to the dimension in the optical image plane corresponding to the vertical direction in the monitored region.

9. The monitoring system of claim 1, wherein the moving body detection sub-system includes a solid-state imaging element in which image signals are generated in plural pixels for each of first and second successive image frames, wherein a difference is obtained between the image signals generated in each pixel for successive first and second image frames.

10. An optical monitoring system, comprising:

a moving body detection sub-system that images a monitored region onto an optical image plane and detects a moving body from changes over time in the monitored region;

a position detection sub-system that detects a position of the moving body in the optical image plane;

a scale detection sub-system that detects a size of the moving body in the optical image plane; and a moving body estimation sub-system that decides whether the moving body is a predetermined monitored subject based on the position detected by the position detection sub-system and the size detected by the scale detection sub-system, the moving body estimation sub-system including:

a correlation relationship storage sub-system that stores correlation relationships between the position and size of predetermined moving bodies; and a class estimation sub-system that checks the position detected by the position detection sub-system and the size detected by the scale detection sub-system against the correlation relationships stored in the correlation relationship storage sub-system to estimate the class of the moving body and decides whether it is the predetermined monitored subject based on the estimated class of the moving body.

11. The monitoring system of claim 10, wherein the moving body estimation sub-system includes an actual scale estimation sub-system that determines an estimated actual size of the moving body based on the position detected by the position detection sub-system and the size detected by the scale detection sub-system, the actual scale estimation sub-system deciding whether the moving body is the predetermined monitored subject based on the estimated actual size of the moving body.

12. The monitoring system of claim 10, wherein the moving body estimation sub-system includes a moving body evaluation sub-system that calculates an evaluation value indicating a certainty that the moving body is the predetermined monitored subject based on the position detected by the position detection sub-system and the size detected by the scale detection sub-system, the moving body evaluation sub-system deciding whether the moving body is the predetermined monitored subject based on the evaluation value of the moving body evaluation sub-system.

13. The monitoring system of claim 10, wherein the moving body detection sub-system includes a solid-state imaging element in which image signals are generated in plural pixels for each of first and second successive image frames, wherein a difference is obtained between the image signals generated in each pixel for successive first and second image frames.

14. The monitoring system of any of claims 1, 2, 4, and 9–11 wherein the moving body estimation sub-system decides whether a moving body is the predetermined monitored subject for a limited specified area of the monitored region.

15. An optical monitoring method, comprising:

imaging a monitored region onto an optical image plane and detecting a moving body from changes over time in the monitored region;

detecting a speed of the moving body in the optical image plane;

detecting a size for the moving body in the optical image plane;

deciding whether the moving body is a predetermined monitored subject based on the detected speed in the optical image plane and the detected size in the optical image plane;

storing correlation relationships between an optical image plane speed and an optical image plane size for predetermined classes of moving bodies;

comparing the detected speed in the optical image plane and the size detected in the optical image plane against the stored correlation relationships to estimate a class for the moving body; and deciding whether the moving body is the predetermined monitored subject based on the estimated class of the moving body.

16. The monitoring method of claim 15, further including;

determining an estimated actual size of the moving body based on the speed detected in the optical image plane and the size detected in the optical image plane; and deciding whether the moving body is the predetermined monitored subject based on the estimated actual size of the moving body.

17. The monitoring method of claim 15, further including:

determining an evaluation value indicating a certainty that the moving body is the predetermined monitored subject based on the speed detected in the optical image plane and the size detected in the optical image plane; and deciding whether the moving body is the predetermined monitored subject based on the evaluation value.

18. The monitoring method of claim 15, further comprising deciding whether a moving body is the predetermined monitored subject only for a limited specified area of the monitored region.

19. An optical monitoring method, comprising:

imaging a monitored region onto an optical image plane and detecting a moving body from changes over time in the monitored region;

detecting a position of the moving body in the optical image plane;

detecting a size of the moving body in the optical image plane;

deciding whether the moving body is a predetermined monitored subject based on the position detected in the optical image plane and the size detected in the optical image plane;

determining an estimated actual size of the moving body based on the position detected in the optical image plane and the size detected in the optical image plane, and deciding whether the moving body is the predetermined monitored subject based on the estimated actual size of the moving body.

20. The monitoring method of claim 19, further including:

storing correlation relationships between an image plane position and an image plane size of predetermined moving bodies; and checking the position detected in the optical image plane and the size detected in the optical image plane against the stored correlation relationships to estimate the class of the moving body; and deciding whether the moving body is the predetermined monitored subject based on the estimated class of the moving body.

21. The monitoring method of claim 19, further including determining an evaluation value indicating a certainty that the moving body is the predetermined monitored subject based on the position detected in the optical image plane and the size detected in the image plane; and deciding whether the moving body is the predetermined monitored subject based on the evaluation value.

22. The monitoring method of claim 19, further comprising deciding whether a moving body is the predetermined monitored subject only for a limited specified area of the monitored region.

* * * * *